US012772071B2

(12) United States Patent
Qi

(10) Patent No.: US 12,772,071 B2
(45) Date of Patent: Oct. 20, 2026

(54) COMPUTER SIMULATION FOR THE DESIGN OF WIRELESS NETWORK INFRASTRUCTURE

(71) Applicant: GM Global Technology Operations LLC, Detroit, MI (US)

(72) Inventor: Wenyuan Qi, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 298 days.

(21) Appl. No.: 18/524,516

(22) Filed: Nov. 30, 2023

(65) Prior Publication Data

US 2025/0150842 A1 May 8, 2025

(30) Foreign Application Priority Data

Nov. 2, 2023 (CN) ......................... 202311455238.9

(51) Int. Cl.
*H04W 16/22* (2009.01)
*H04W 16/18* (2009.01)

(52) U.S. Cl.
CPC ........... *H04W 16/22* (2013.01); *H04W 16/18* (2013.01)

(58) Field of Classification Search
CPC .............................. H04W 16/22; H04W 16/18
USPC .......................................................... 370/252
See application file for complete search history.

(56) References Cited

U.S. PATENT DOCUMENTS 9,350,635 B2 5/2016 Vasseur et al.
10,922,211 B2 * 2/2021 Jaros ................... G06F 11/3688
11,128,391 B1 9/2021 Aldossari et al.
11,129,192 B2 9/2021 Kela et al.
11,436,544 B2 9/2022 Kulkarni et al.
11,438,792 B2 * 9/2022 Zhou ........................ H04W 8/04
12,010,678 B2 * 6/2024 Kim ...................... H04W 72/51
12,278,752 B2 * 4/2025 Mengwasser ........... H04L 43/20
12,323,819 B2 * 6/2025 Tosyali ................. H04W 24/02
12,324,045 B2 * 6/2025 Di Girolamo ........ H04W 76/19
12,347,551 B1 7/2025 Kaneria
12,363,573 B2 * 7/2025 Ly ......................... H04W 24/10
12,375,954 B2 * 7/2025 Hirzallah .............. H04W 72/21
12,389,273 B2 * 8/2025 Yeh ...................... H04W 28/084
12,414,021 B2 * 9/2025 Yeung ................... H04W 16/28
12,445,905 B2 * 10/2025 Balakrishnan .... H04W 28/0925
12,484,000 B2 * 11/2025 Sun ....................... H04W 52/50
12,501,234 B2 * 12/2025 Soryal ................... H04W 4/025
(Continued)

*Primary Examiner* — Melvin H Pollack
(74) *Attorney, Agent, or Firm* — Vivacqua Crane, PLLC

(57) ABSTRACT

A method for providing a computer simulation of wireless infrastructure may include initializing a simulated environment. The simulated environment includes a plurality of environment parameters. The method further may include adding a plurality of simulated wireless nodes to the simulated environment to form a simulated wireless network, based on a plurality of node parameters. The method further may include evaluating at least one performance metric of the simulated wireless network. The method further may include adjusting at least one of: the plurality of node parameters and the plurality of environment parameters based at least in part on the at least one performance metric of the simulated wireless network. The method further may include repeating the evaluating and adjusting steps until an optimal solution for the plurality of node parameters is identified based at least in part on the at least one performance metric.

17 Claims, 3 Drawing Sheets

(56) References Cited

U.S. PATENT DOCUMENTS

| | | | | |
|---|---|---|---|---|
| 12,501,433 | B2 * | 12/2025 | Freda | H04W 72/20 |
| 12,532,192 | B2 * | 1/2026 | Imran | H04W 24/02 |
| 2008/0064337 | A1 | 3/2008 | Saily et al. | |
| 2013/0244644 | A1 | 9/2013 | Amirijoo et al. | |
| 2013/0272162 | A1 | 10/2013 | Li et al. | |
| 2015/0280985 | A1 | 10/2015 | Takita et al. | |
| 2016/0019086 | A1 | 1/2016 | Lee et al. | |
| 2017/0104632 | A1 | 4/2017 | Kim et al. | |
| 2017/0302572 | A1 | 10/2017 | Izhak-Ratzin et al. | |
| 2019/0057684 | A1 | 2/2019 | Roh et al. | |
| 2019/0278806 | A1 | 9/2019 | Koyanagi et al. | |
| 2019/0342180 | A1 * | 11/2019 | Figueira | H04L 41/0816 |
| 2020/0059798 | A1 | 2/2020 | Wang et al. | |
| 2020/0107366 | A1 | 4/2020 | Kela et al. | |
| 2021/0111981 | A1 | 4/2021 | Nahata et al. | |
| 2021/0294944 | A1 * | 9/2021 | Nassar | G05D 1/0088 |
| 2021/0392202 | A1 | 12/2021 | Casey et al. | |
| 2022/0041433 | A1 | 2/2022 | Alsaleem et al. | |
| 2022/0070822 | A1 | 3/2022 | Behboodi et al. | |
| 2023/0117824 | A1 * | 4/2023 | Coster | G06F 30/20 703/21 |
| 2023/0135398 | A1 | 5/2023 | Vahedforough et al. | |
| 2023/0153222 | A1 | 5/2023 | Fardig et al. | |
| 2023/0421454 | A1 | 12/2023 | Okuno | |
| 2024/0121790 | A1 * | 4/2024 | Abotabl | H04W 72/23 |
| 2024/0129195 | A1 | 4/2024 | Ji et al. | |
| 2024/0134626 | A1 | 4/2024 | Bakshi et al. | |
| 2025/0056343 | A1 * | 2/2025 | Awada | H04W 36/0058 |
| 2025/0077883 | A1 | 3/2025 | Gazvoda et al. | |
| 2025/0081145 | A1 * | 3/2025 | Hirzallah | H04L 5/0035 |
| 2025/0184861 | A1 * | 6/2025 | Sahyoun | H04W 8/005 |
| 2025/0203399 | A1 * | 6/2025 | Cheema | H04B 7/0626 |
| 2025/0211312 | A1 * | 6/2025 | Li | H04L 5/0025 |
| 2025/0227655 | A1 | 7/2025 | Murari et al. | |
| 2025/0234233 | A1 * | 7/2025 | Kim | H04W 24/10 |
| 2025/0247858 | A1 * | 7/2025 | Talarico | H04W 74/0808 |
| 2025/0260449 | A1 * | 8/2025 | Guan | H04B 7/0658 |
| 2025/0317809 | A1 * | 10/2025 | Kim | H04W 36/0085 |
| 2025/0337474 | A1 * | 10/2025 | Pezeshki | H04B 17/328 |
| 2025/0343591 | A1 * | 11/2025 | Li | H04B 7/06964 |
| 2025/0344085 | A1 * | 11/2025 | Kim | G06N 3/04 |
| 2025/0386217 | A1 * | 12/2025 | Kim | H04B 7/06964 |
| 2025/0386262 | A1 * | 12/2025 | Li | H04W 36/03 |

* cited by examiner

COMPUTER SIMULATION FOR THE DESIGN OF WIRELESS NETWORK INFRASTRUCTURE

INTRODUCTION

The present disclosure relates to computer simulation for the design of wireless network infrastructure.

To increase occupant awareness and convenience, vehicles may be equipped with various sensors and systems such as, for example, perception sensors (e.g., camera, radar, ultrasonic distance sensors, and/or the like), microphones, navigation systems, advanced driver assistance systems (ADAS), automated driving systems (ADS), and/or the like. Such sensors and systems may produce data to be wirelessly transferred using cellular network infrastructure. Therefore, an increasing number of vehicles may utilize cellular network infrastructure to transfer critical data related to occupant awareness and convenience. However, current cellular network infrastructure may not be designed to accommodate a high volume of highly connected vehicles transferring large amounts of data. Additionally, some vehicle tasks, including, for example, ADAS tasks, may require enhanced cellular network performance (e.g., low latency communication) for effective operation. As a result, current systems and methods for design of wireless network infrastructure may not produce optimal solutions in the context of increasing vehicle connectivity.

Thus, while current systems and methods for design of wireless network infrastructure achieve their intended purpose, there is a need for a new and improved system and method for computer simulation for the design of wireless network infrastructure.

SUMMARY

According to several aspects, a method for providing a computer simulation of wireless infrastructure is provided. The method may include initializing a simulated environment. The simulated environment includes a plurality of environment parameters. The method further may include adding a plurality of simulated wireless nodes to the simulated environment to form a simulated wireless network, based on a plurality of node parameters. The method further may include evaluating at least one performance metric of the simulated wireless network. The method further may include adjusting at least one of: the plurality of node parameters and the plurality of environment parameters based at least in part on the at least one performance metric of the simulated wireless network. The method further may include repeating the evaluating and adjusting steps until an optimal solution for the plurality of node parameters is identified based at least in part on the at least one performance metric.

In another aspect of the present disclosure, initializing the simulated environment further may include generating the plurality of environment parameters. The plurality of environment parameters includes at least: an environment size, an environment traffic density, and a signal to interference and noise ratio (SINR). The environment traffic density models a quantity of a plurality of simulated vehicles and a wireless traffic volume of the plurality of simulated vehicles in the simulated environment. The SINR models noise and interference in the simulated environment.

In another aspect of the present disclosure, adding the plurality of simulated wireless nodes to the simulated environment may further include generating the plurality of node parameters. The plurality of node parameters includes at least a quantity of simulated wireless nodes, a node location for each of the plurality of simulated wireless nodes, and a node power level for each of the plurality of simulated wireless nodes.

In another aspect of the present disclosure, evaluating the at least one performance metric of the simulated wireless network further may include determining the at least one performance metric of the simulated wireless network. Evaluating the at least one performance metric of the simulated wireless network further may include comparing the at least one performance metric to at least one performance metric target.

In another aspect of the present disclosure, adjusting at least one of: the plurality of node parameters and the plurality of environment parameters further may include saving the plurality of node parameters in a database in response to determining that the at least one performance metric satisfies the at least one performance metric target. Adjusting at least one of: the plurality of node parameters and the plurality of environment parameters further may include adjusting the plurality of environment parameters while holding the plurality of node parameters constant in response to determining that the at least one performance metric satisfies the at least one performance metric target. Adjusting at least one of: the plurality of node parameters and the plurality of environment parameters further may include adjusting the plurality of node parameters while holding the plurality of environment parameters constant in response to determining that the at least one performance metric does not satisfy the at least one performance metric target.

In another aspect of the present disclosure, adjusting the plurality of node parameters further may include training a node parameter adjustment machine learning model based at least in part on the plurality of environment parameters, the plurality of node parameters, and the at least one performance metric. The node parameter adjustment machine learning model is configured to receive the plurality of environment parameters, the plurality of node parameters, and the at least one performance metric as an input and provide an adjusted plurality of node parameters as an output. Adjusting the plurality of node parameters further may include adjusting the plurality of node parameters using the node parameter adjustment machine learning model. The node parameter adjustment machine learning model is provided with the plurality of environment parameters, the plurality of node parameters, and the at least one performance metric as the input and provides the adjusted plurality of node parameters as the output.

In another aspect of the present disclosure, adjusting the plurality of environment parameters further may include adjusting the plurality of environment parameters to increase a simulated environment complexity. Increasing the simulated environment complexity includes at least: increasing the environment traffic density.

In another aspect of the present disclosure, adjusting the plurality of environment parameters to increase the simulated environment complexity further may include adjusting the plurality of environment parameters using an environment parameter adjustment machine learning algorithm. The environment parameter adjustment machine learning algorithm is configured to receive at least one of: the plurality of environment parameters and the at least one performance metric as an input and provide an adjusted plurality of environment parameters as an output.

In another aspect of the present disclosure, repeating the evaluating and adjusting steps until the optimal solution for the plurality of node parameters is identified further may include identifying at least one simulation stopping condition. Repeating the evaluating and adjusting steps until the optimal solution for the plurality of node parameters is identified further may include determining the optimal solution to be identified in response to identifying the at least one simulation stopping condition.

In another aspect of the present disclosure, identifying the at least one simulation stopping condition further may include identifying the at least one simulation stopping condition in response to determining that a predetermined quantity of simulations have been executed. Identifying the at least one simulation stopping condition further may include identifying the at least one simulation stopping condition in response to determining that the simulated environment has reached a predetermined simulated environment complexity.

According to several aspects, a system for providing a computer simulation of wireless infrastructure is provided, the system may include a database and one or more central computers in electrical communication with the database. The one or more central computers are programmed to initialize a simulated environment. The simulated environment includes a plurality of environment parameters. The one or more central computers are further programmed to add a plurality of simulated wireless nodes to the simulated environment to form a simulated wireless network, based on a plurality of node parameters. The one or more central computers are further programmed to evaluate at least one performance metric of the simulated wireless network. The one or more central computers are further programmed to adjust at least one of: the plurality of node parameters and the plurality of environment parameters based at least in part on the at least one performance metric of the simulated wireless network. The one or more central computers are further programmed to repeat the evaluate and adjust steps until an optimal solution for the plurality of node parameters is identified based at least in part on the at least one performance metric. The one or more central computers are further programmed to save the optimal solution for the plurality of node parameters in the database.

In another aspect of the present disclosure, to initialize the simulated environment, the one or more central computers are further programmed to generate the plurality of environment parameters. The plurality of environment parameters includes at least an environment size, an environment traffic density, and a signal to interference and noise ratio (SINR). The environment traffic density models a quantity of a plurality of simulated vehicles and a wireless traffic volume of the plurality of simulated vehicles in the simulated environment. The SINR models noise and interference in the simulated environment.

In another aspect of the present disclosure, to add the plurality of simulated wireless nodes to the simulated environment to form the simulated wireless network, the one or more central computers are further programmed to generate the plurality of node parameters. The plurality of node parameters includes at least a quantity of simulated wireless nodes, a node location for each of the plurality of simulated wireless nodes, and a node power level for each of the plurality of simulated wireless nodes.

In another aspect of the present disclosure, to adjust at least one of: the plurality of node parameters and the plurality of environment parameters, the one or more central computers are further programmed to save the plurality of node parameters in the database in response to determining that the at least one performance metric satisfies the at least one performance metric target. To adjust at least one of: the plurality of node parameters and the plurality of environment parameters, the one or more central computers are further programmed to adjust the plurality of environment parameters while holding the plurality of node parameters constant in response to determining that the at least one performance metric satisfies the at least one performance metric target. To adjust at least one of: the plurality of node parameters and the plurality of environment parameters, the one or more central computers are further programmed to adjust the plurality of node parameters while holding the plurality of environment parameters constant in response to determining that the at least one performance metric does not satisfy the at least one performance metric target.

In another aspect of the present disclosure, to adjust the plurality of node parameters, the one or more central computers are further programmed to train a node parameter adjustment machine learning model based at least in part on the plurality of environment parameters, the plurality of node parameters, and the at least one performance metric. The node parameter adjustment machine learning model is configured to receive the plurality of environment parameters, the plurality of node parameters, and the at least one performance metric as an input and provide an adjusted plurality of node parameters as an output. To adjust the plurality of node parameters, the one or more central computers are further programmed to adjust the plurality of node parameters using the node parameter adjustment machine learning model. The node parameter adjustment machine learning model is provided with the plurality of environment parameters, the plurality of node parameters, and the at least one performance metric as the input and provides the adjusted plurality of node parameters as the output.

In another aspect of the present disclosure, to adjust the plurality of environment parameters, the one or more central computers are further programmed to adjust the plurality of environment parameters by sampling from a plurality of probability distributions corresponding to each of the plurality of environment parameters.

In another aspect of the present disclosure, to repeat the evaluate and adjust steps until an optimal solution for the plurality of node parameters is identified, the one or more central computers are further programmed to identify at least one simulation stopping condition in response to determining that at least one of: a predetermined quantity of simulations have been executed and the simulated environment has reached a predetermined simulated environment complexity. To repeat the evaluate and adjust steps until an optimal solution for the plurality of node parameters is identified, the one or more central computers are further programmed to determine the optimal solution to be identified in response to identifying the at least one simulation stopping condition.

According to several aspects, a method for providing a computer simulation of wireless infrastructure for a plurality of simulated vehicles is provided. The method may include initializing a simulated environment. The simulated environment includes a plurality of environment parameters. The plurality of environment parameters includes at least: an environment size, an environment traffic density, and a signal to interference and noise ratio (SINR). The environment traffic density models a quantity of the plurality of simulated vehicles and a wireless traffic volume of the plurality of simulated vehicles in the simulated environment. The SINR models noise and interference in the simulated environment. The method further may include adding a plurality of simulated wireless nodes to the simulated environment to form a simulated wireless network based on a plurality of node parameters. The plurality of node parameters includes at least: a quantity of simulated wireless nodes, a node location for each of the plurality of simulated wireless nodes, and a node power level for each of the plurality of simulated wireless nodes. The method further may include evaluating at least one performance metric of the simulated wireless network by comparing the at least one performance metric to at least one performance metric target. The method further may include adjusting at least one of: the plurality of node parameters and the plurality of environment parameters based at least in part on the at least one performance metric of the simulated wireless network. The method further may include repeating the evaluating and adjusting steps until an optimal solution for the plurality of node parameters is identified based at least in part on the at least one performance metric. The evaluating and adjusting steps are repeated until at least one simulation stopping condition has been identified. The at least one simulation stopping condition is identified in response to determining that a predetermined quantity of simulations have been executed.

In another aspect of the present disclosure, adjusting the plurality of node parameters further may include training a node parameter adjustment machine learning model based at least in part on the plurality of environment parameters, the plurality of node parameters, and the at least one performance metric. The node parameter adjustment machine learning model is configured to receive the plurality of environment parameters, the plurality of node parameters, and the at least one performance metric as an input and provide an adjusted plurality of node parameters as an output. Adjusting the plurality of node parameters further may include adjusting the plurality of node parameters using the node parameter adjustment machine learning model. The node parameter adjustment machine learning model is provided with the plurality of environment parameters and the at least one performance metric as the input and provides the adjusted plurality of node parameters as the output.

In another aspect of the present disclosure, adjusting the plurality of environment parameters further may include adjusting the plurality of environment parameters to increase a simulated environment complexity using an environment parameter adjustment machine learning algorithm. The environment parameter adjustment machine learning algorithm is configured to receive at least one of: the plurality of environment parameters and the at least one performance metric as an input and provide an adjusted plurality of environment parameters as an output.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

In aspects of the present disclosure, vehicles are increasingly connected to wireless and/or cellular network infrastructure for the purpose of transferring data related to tasks such as, for example, advanced driver assistance systems (ADAS), automated driving systems (ADS), and/or the like. Current systems and methods for design of wireless network infrastructure may not produce optimal solutions in the context of increasing vehicle connectivity. Therefore, the present disclosure provides a new and improved system and method for computer simulation for the design of wireless network infrastructure which addresses the challenges posed by the increasing number of connected vehicles.

The following description is merely exemplary in nature and is not intended to limit the present disclosure, application, or uses.

Figure 1:
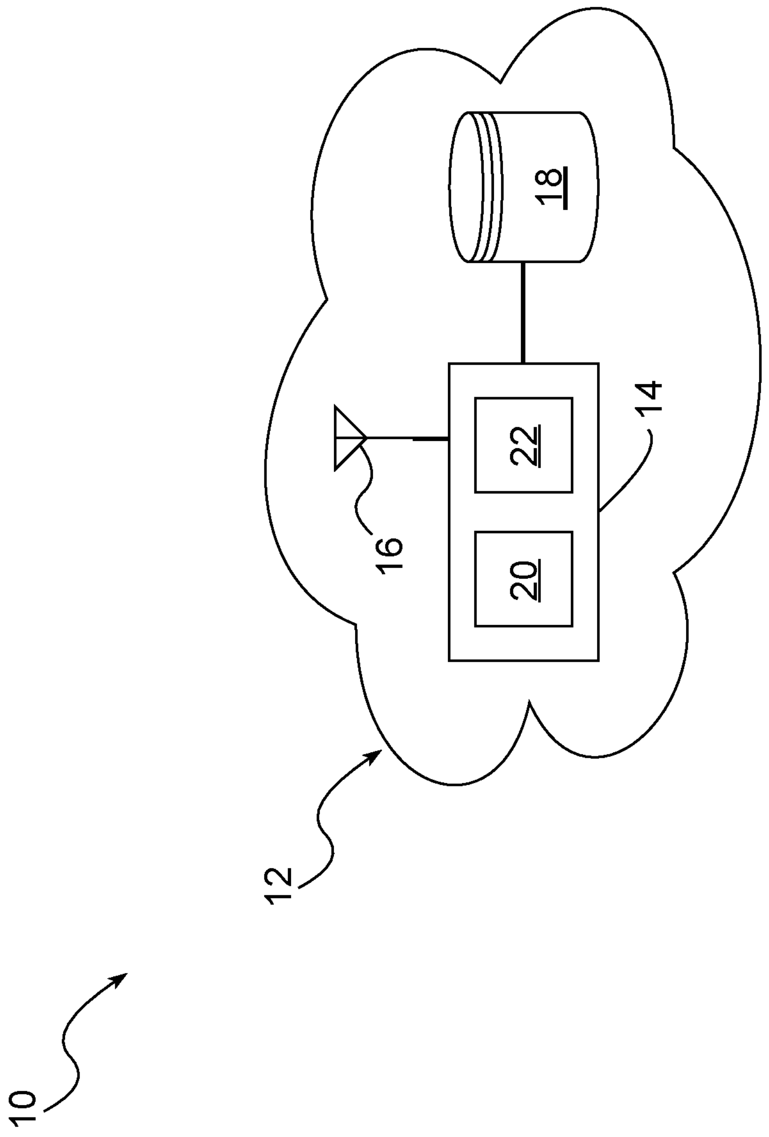
FIG. 1 is a schematic diagram of a system for providing a computer simulation of wireless infrastructure, according to an exemplary embodiment.

Referring to FIG. 1, a system for providing a computer simulation of wireless infrastructure is illustrated and generally indicated by reference number 10. The system 10 generally includes one or more central computers 12.

The one or more central computers 12 are used to implement a method 100 for providing a computer simulation of wireless infrastructure, as will be described below. The one or more central computers 12 include at least one controller 14, a central computer communication system 16, and a database 18.

The controller 14 includes at least one processor 20 and a non-transitory computer readable storage device or media 22. The processor 20 may be a custom made or commercially available processor, a central processing unit (CPU), a graphics processing unit (GPU), an auxiliary processor among several processors associated with the one or more central computers 12, a semiconductor-based microprocessor (in the form of a microchip or chip set), a macroprocessor, a combination thereof, or generally a device for executing instructions.

The computer readable storage device or media 22 may include volatile and nonvolatile storage in read-only memory (ROM), random-access memory (RAM), and keep-alive memory (KAM), for example. KAM is a persistent or non-volatile memory that may be used to store various operating variables while the processor 20 is powered down. The computer-readable storage device or media 22 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the one or more central computers 12 to perform the method 100.

The central computer communication system 16 is used by the controller 14 to communicate with other systems external to the one or more central computers 12. For example, the central computer communication system 16 includes capabilities for communication with vehicles ("V2I" communication). In certain embodiments, the central computer communication system 16 is a wireless communication system configured to communicate via a wireless local area network (WLAN) using IEEE 802.11 standards or by using cellular data communication (e.g., using GSMA standards, such as, for example, SGP.02, SGP.22, SGP.32, and the like). Accordingly, the central computer communication system 16 may further include an embedded universal integrated circuit card (eUICC) configured to store at least one cellular connectivity configuration profile, for example, an embedded subscriber identity module (eSIM) profile. The central computer communication system 16 is further configured to communicate via a personal area network (e.g., BLUETOOTH), near-field communication (NFC), and/or any additional type of radiofrequency communication.

Accordingly, the central computer communication system 16 may include one or more antennas and/or communication transceivers for receiving and/or transmitting signals. The central computer communication system 16 is configured to wirelessly communicate information between the one or more central computers 12 and external communication networks, such as, for example, the internet. The central computer communication system 16 is in electrical communication with the controller 14. It should be understood that the central computer communication system 16 may be integrated with the one or more central computers 12 (e.g., on a same circuit board with the one or more central computers 12 or otherwise a part of the one or more central computers 12) without departing from the scope of the present disclosure.

The database 18 is used to store information about an optimal solution for a plurality of node parameters, as will be discussed in greater detail below. In an exemplary embodiment, the database 18 includes one or more mass storage devices, such as, for example, hard disk drives, magnetic tape drives, magneto-optical disk drives, optical disks, solid-state drives, and/or additional devices operable to store data in a persisting and machine-readable fashion. In some examples, the one or more mass storage devices may be configured to provide redundancy in case of hardware failure and/or data corruption, using, for example, a redundant array of independent disks (RAID). In a non-limiting example, the controller 14 may execute software such as, for example, a database management system (DBMS), allowing data stored on the one or more mass storage devices to be organized and accessed. The database 18 is in electrical communication with the controller 14.

The controller 14 is in electrical communication with the central computer communication system 16 and the database 18. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the controller 14 are within the scope of the present disclosure.

Figure 2:
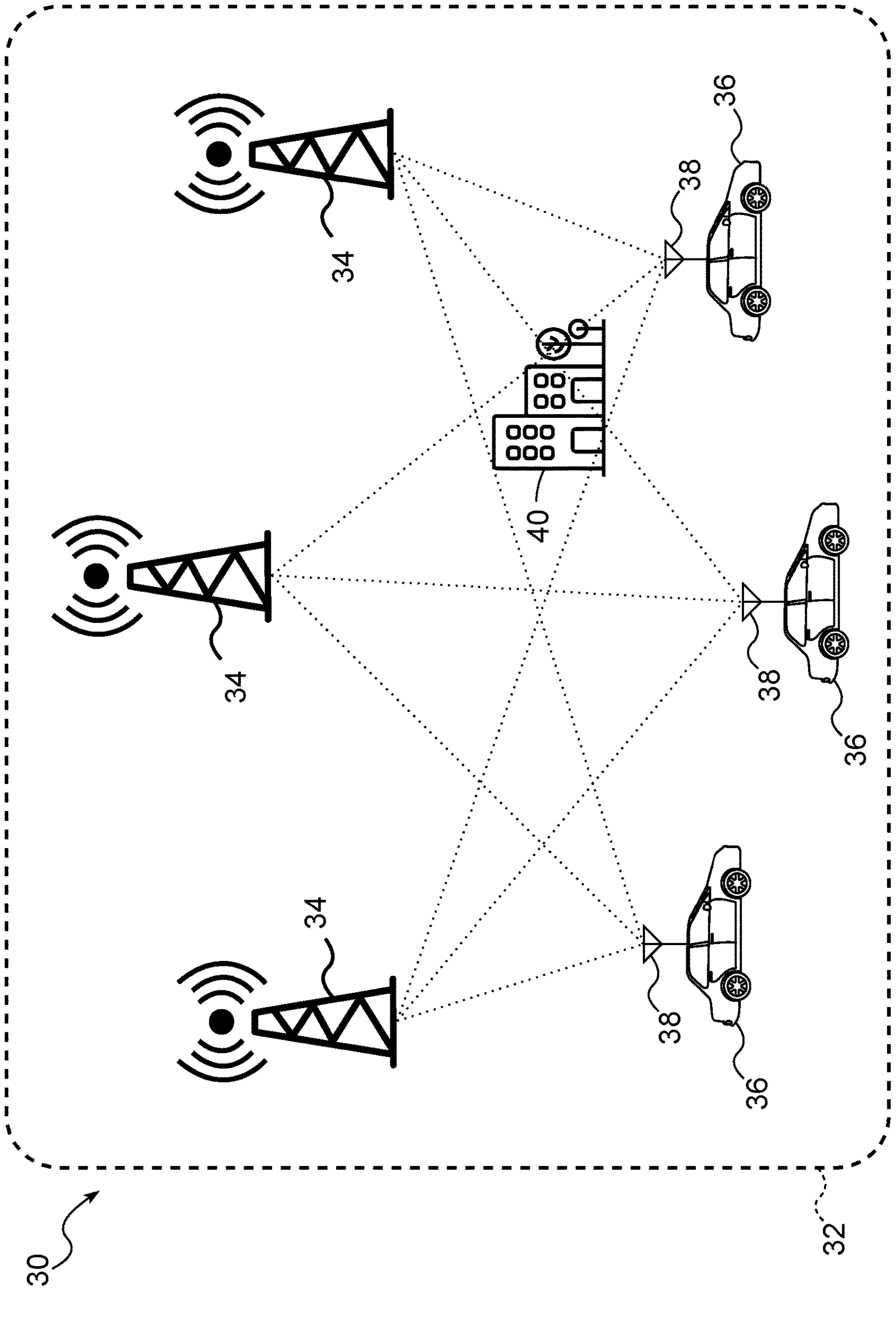
FIG. 2 is a schematic diagram of a simulated wireless network, according to an exemplary embodiment.

Referring to FIG. 2, a schematic diagram of a simulated wireless network 30 is shown. The simulated wireless network 30 includes a simulated environment 32 and a plurality of simulated wireless nodes 34. The simulated environment 32 is defined by a plurality of environment parameters. In an exemplary embodiment, the plurality of environment parameters includes, for example, an environment size (e.g., one hundred square kilometers), an environment traffic density, and a signal to interference and noise ratio (SINR). In the scope of the present disclosure, the environment traffic density models a quantity of a plurality of simulated vehicles 36 in the simulated environment 32 and a wireless traffic volume of the plurality of simulated vehicles 36 in the simulated environment 32. Each of the plurality of simulated vehicles 36 has a vehicle wireless communication system 38 in wireless electrical communication with one or more of the plurality of simulated wireless nodes 34. The SINR models noise and interference in the simulated environment 32 (e.g., noise and interference caused by obstructions 40). It should be understood that the SINR may be modeled as a constant value throughout the simulated environment 32 or a discrete or continuous varying value throughout the simulated environment 32.

The plurality of simulated wireless nodes 34 model wireless telecommunications nodes. In the scope of the present disclosure, a wireless node is a site including electronic communications equipment (e.g., antennas, transceivers, digital signal processors, control electronics, and/or the like) configured to connect user equipment (UE) to a wireless network (e.g., a cellular network). In a non-limiting example, the simulated wireless nodes 34 model gNodeB (next generation Node B) cellular network base stations configured to provide the plurality of simulated vehicles 36 access to a simulated 5G cellular network. It should be understood that the plurality of simulated wireless nodes 34 may model other types of telecommunications nodes, including, for example, Node B (i.e., 3G cellular network base stations), eNodeB (i.e., 4G cellular network base stations), WiFi access points, and/or the like.

The plurality of simulated wireless nodes 34 are defined by a plurality of node parameters. In an exemplary embodiment, the plurality of node parameters includes, for example, a quantity of the plurality of simulated wireless nodes 34 (e.g., three nodes, as shown in FIG. 2), a node location for each of the plurality of simulated wireless nodes 34 (i.e., a location of each of the plurality of simulated wireless nodes 34 within the simulated environment 32), and a node power level for each of the plurality of simulated wireless nodes 34 (i.e., a radio transmission power of each of the plurality of simulated wireless nodes measured in, for example, watts). The simulated environment 32 including the plurality of simulated wireless nodes 34 is referred to as the simulated wireless network 30.

Figure 3:
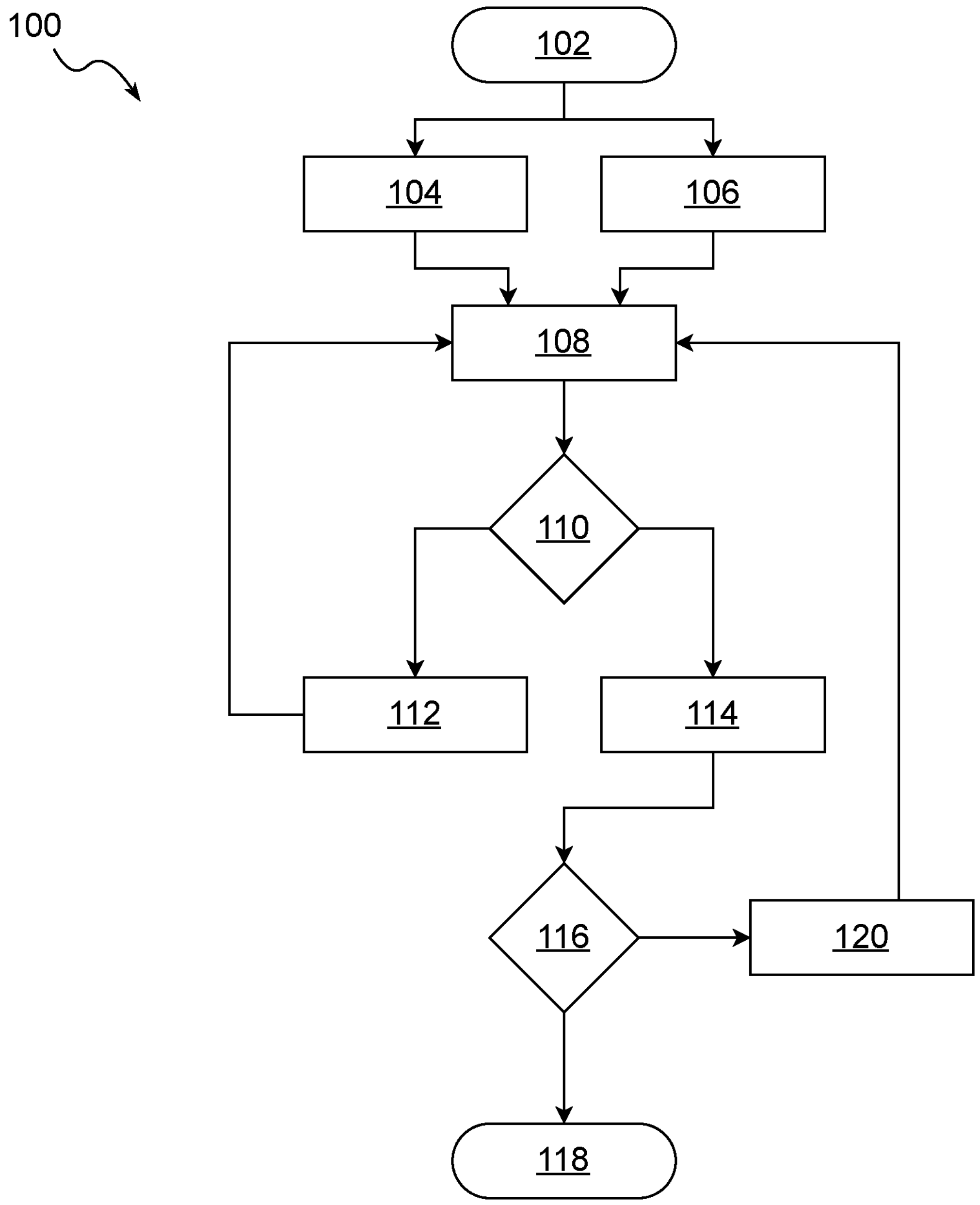
FIG. 3 is a flowchart of the method for providing a computer simulation of wireless infrastructure, according to an exemplary embodiment.

Referring to FIG. 3, a flowchart of the method 100 for providing a computer simulation of wireless infrastructure is shown. With reference to FIG. 3 and continued reference to FIG. 2, the method 100 begins at block 102 and proceeds to blocks 104 and 106. At block 104, the controller 14 initializes the simulated environment 32. In an exemplary embodiment, to initialize the simulated environment 32, the controller 14 generates the plurality of environment parameters. In a non-limiting example, the controller 14 generates the plurality of environment parameters by sampling from a plurality of probability distributions corresponding to each of the plurality of environment parameters. For example, the plurality of probability distributions includes an environment size probability distribution, an environment traffic density probability distribution, and a SINR probability distribution. In another non-limiting example, the plurality of environment parameters are randomly generated. After block 104, the method 100 proceeds to block 108, as will be discussed in greater detail below.

At block 106, the controller 14 adds the plurality of simulated wireless nodes 34 to the simulated environment 32. In an exemplary embodiment, to add the plurality of simulated wireless nodes 34 to the simulated environment 32, the controller 14 generates the plurality of node parameters. In a non-limiting example, the controller 14 generates the plurality of node parameters by sampling from a plurality of probability distributions corresponding to each of the plurality of node parameters. For example, the plurality of probability distributions includes a node quantity probability distribution, a node location probability distribution, and a node power level probability distribution. In another non-limiting example, the plurality of node parameters are randomly generated. After block 106, the method 100 proceeds to block 108, as will be discussed in greater detail below.

At block 108, the controller 14 determines at least one performance metric of the simulated wireless network 30 (i.e., the simulated environment 32 with the plurality of simulated wireless nodes 34). In the scope of the present disclosure, the at least one performance metric includes at least one of: a simulated bandwidth usage, a simulated packet loss rate, a simulated packet retransmission rate, a simulated network throughput, a simulated network latency, a simulated network jitter, a simulated network uptime, and/or the like. In an exemplary embodiment, to determine the at least one performance metric, the controller 14 simulates network traffic between the plurality of simulated vehicles 36 and the plurality of simulated wireless nodes 34. During the network traffic simulation, the controller 14 determines the at least one performance metric of the simulated wireless network 30. In a non-limiting example, the controller 14 may perform a simulated video upload task where each of the plurality of simulated vehicles 36 attempt to upload a high-definition video to the plurality of simulated wireless nodes 34. The controller 14 evaluates one or more of: the simulated network throughput, the simulated packet loss rate, the simulated network latency, and/or the like. After block 108, the method 100 proceeds to block 110.

At block 110, the controller 14 compares the at least one performance metric determined at block 108 to at least one performance metric target. In a non-limiting example, the at least one performance metric target includes, for example, a target simulated bandwidth usage, a target simulated packet loss rate, a target simulated packet retransmission rate, a target simulated network throughput, a target simulated network latency, a target simulated network jitter, a target simulated network uptime, and/or the like. In another non-limiting example, the at least one performance metric target may include a combination (e.g., a sum, an average, a weighted average, and/or the like) of multiple performance metric targets. In another non-limiting example, the at least one performance metric target may be determined based on the network task performed by the plurality of simulated vehicles 36. For example, if the plurality of simulated vehicles 36 are performing a simulated safety-critical task (e.g., a simulated ADAS task), a low target simulated network latency may be required. If the plurality of simulated vehicles 36 are performing a simulated convenience task (e.g., upload of dashcam video), the target simulated network latency may be higher. In another non-limiting example, the at least one performance metric target may be determined using a machine learning algorithm.

If the at least one performance metric does not satisfy the at least one performance metric target, the method 100 proceeds to block 112. If the at least one performance metric does satisfy the at least one performance metric target, the method 100 proceeds to block 114, as will be discussed in greater detail below. In the scope of the present disclosure, for the case when higher is better (e.g., simulated network throughput), satisfying the at least one performance metric target means that the at least one performance metric is greater than the at least one performance metric target. For the case when lower is better (e.g., simulated network latency), satisfying the at least one performance metric target means that the at least one performance metric is less than the at least one performance metric target.

At block 112, the controller 14 adjusts the plurality of node parameters in response to determining that the at least one performance metric does not satisfy the at least one performance metric target. The plurality of environment parameters are held constant. In an exemplary embodiment, to adjust the plurality of node parameters, the controller 14 executes a node parameter adjustment machine learning model.

In a non-limiting example, the node parameter adjustment machine learning model includes multiple layers, including an input layer and an output layer, as well as one or more hidden layers. The input layer receives the plurality of environment parameters, the plurality of node parameters, and the at least one performance metric as inputs. The inputs are then passed on to the hidden layers. Each hidden layer applies a transformation (e.g., a non-linear transformation) to the data and passes the result to the next hidden layer until the final hidden layer. The output layer produces the adjusted plurality of node parameters as an output.

To train the node parameter adjustment machine learning model, a dataset of inputs and their corresponding an adjusted plurality of node parameters as an output is used. The algorithm is trained by adjusting internal weights between nodes in each hidden layer to minimize prediction error. During training, an optimization technique (e.g., gradient descent) is used to adjust the internal weights to reduce the prediction error. The training process is repeated with the entire dataset until the prediction error is minimized, and the resulting trained model is then used to process new input data.

After sufficient training of the node parameter adjustment machine learning model, the algorithm is capable of accurately and precisely determining an adjusted plurality of node parameters as an output based on the plurality of environment parameters and the at least one performance metric. By adjusting the weights between the nodes in each hidden layer during training, the algorithm "learns" to recognize patterns in the data that are indicative of the adjusted plurality of node parameters which improve the performance of the simulated wireless network 30. After block 112, the method 100 returns to block 108 to determine the at least one performance metric using the simulated environment 32 including the plurality of simulated wireless nodes 34 based on the adjusted plurality of node parameters.

At block 114, the controller 14 saves the plurality of node parameters in the database 18 in response to determining that the at least one performance metric satisfies the at least one performance metric target. In an exemplary embodiment, the plurality of node parameters are saved in the database 18 as a tuple with the corresponding plurality of environment parameters tested. The data saved in the database 18 may be used as additional training data for the node parameter adjustment machine learning model. After block 114, the method 100 proceeds to block 116.

At block 116, the controller 14 evaluates whether at least one stopping condition has been identified. In an exemplary embodiment, the at least one simulation stopping condition is identified in response to determining that at least a predetermined quantity of simulations (e.g., one hundred simulations) have been executed. In another exemplary embodiment, the at least one simulation stopping condition is identified in response to determining that the simulated environment 32 has reached a predetermined simulated environment complexity. The simulated environment complexity will be discussed in greater detail below. In another exemplary embodiment, the at least one simulation stopping condition is identified in response to determining that the at least one performance metric has converged. If the stopping condition has been identified, the method 100 proceeds to enter a standby state at block 118. If the stopping condition has not been identified, the method 100 proceeds to block 120.

At block 120, the controller 14 adjusts the plurality of environment parameters. The plurality of node parameters are held constant. In an exemplary embodiment, the plurality of environment parameters are adjusted such as to increase a simulated environment complexity. In the scope of the present disclosure, the simulated environment complexity is a value which quantifies a complexity of the simulated environment 32, including, for example, network traffic density (e.g., the quantity of the plurality of simulated vehicles 36), the environment size, a quantity of obstructions 40 (i.e., the SINR value in the simulated environment 32), and/or the like. For example, a simulated environment with a high network traffic density, a large environment size, and a large quantity of obstructions 40 may be considered to have a high simulated environment complexity. In a non-limiting example, the simulated environment complexity is determined by a sum, average, or weighted average of normalized values of the network traffic density, environment size, and/or quantity of obstructions 40.

In an exemplary embodiment, to adjust the plurality of environment parameters to increase the simulated environment complexity, the controller 14 uses an environment parameter adjustment machine learning algorithm. In a non-limiting example, the environment parameter adjustment machine learning algorithm is configured to receive at least one of: the plurality of environment parameters and the at least one performance metric as an input and provide an adjusted plurality of environment parameters as an output. The environment parameter adjustment machine learning algorithm is trained to increase the simulated environmental complexity such that corner and edge cases are considered. In some embodiments, the environment parameter adjustment machine learning algorithm is further trained to prevent testing of unneeded scenarios. For example, scenarios which are extremely simple may be filtered out by the environment parameter adjustment machine learning algorithm. In another example, scenarios which are impossible in the real world (e.g., scenarios having an unrealistically large number of simulated vehicles 36 per simulated environment 32 size) may be filtered out by the environment parameter adjustment machine learning algorithm.

In another exemplary embodiment, to adjust the plurality of environment parameters to increase the simulated environment complexity, the controller 14 samples from a plurality of probability distributions corresponding to each of the plurality of environment parameters. For example, the plurality of probability distributions includes an environment size probability distribution, an environment traffic density probability distribution, and a SINR probability distribution. In a non-limiting example, the controller 14 uses Monte Carlo sampling methods to ensure that such that corner and edge cases are considered. After block 120, the method 100 returns to block 108 to determine the at least one performance metric using the simulated environment 32 including the plurality of simulated wireless nodes 34 based on the adjusted plurality of environment parameters.

In an exemplary embodiment, the controller 14 repeatedly exits the standby state 118 and restarts the method 100 at block 102. In a non-limiting example, the controller 14 exits the standby state 118 and restarts the method 100 on a timer, for example, every three hundred milliseconds.

The system 10 and method 100 of the present disclosure offer several advantages. After execution of the method 100, the database 18 contains one or more optimal solutions for the plurality of node parameters. The one or more optimal solutions are used and practically applied to inform design and installation of cellular network infrastructure and/or improvement of existing cellular infrastructure. Using the system 10 and method 100, complex edge/corner cases may be simulated to optimize the plurality of node parameters such that the cellular network infrastructure may be designed to handle non-idealities in the real world. Improvement of cellular network coverage and performance results in improved user experience for vehicle occupants utilizing vehicle connectivity features.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for providing a computer simulation of wireless infrastructure, the method comprising:

initializing a simulated environment, wherein the simulated environment includes a plurality of environment parameters;

adding a plurality of simulated wireless nodes to the simulated environment to form a simulated wireless network, based on a plurality of node parameters;

evaluating at least one performance metric of the simulated wireless network;

adjusting at least one of: the plurality of node parameters and the plurality of environment parameters based at least in part on the at least one performance metric of the simulated wireless network, wherein adjusting at least one of: the plurality of node parameters and the plurality of environment parameters further comprises:

saving the plurality of node parameters in a database in response to determining that the at least one performance metric satisfies at least one performance metric target;

adjusting the plurality of environment parameters while holding the plurality of node parameters constant in response to determining that the at least one performance metric satisfies the at least one performance metric target; and adjusting the plurality of node parameters while holding the plurality of environment parameters constant in response to determining that the at least one performance metric does not satisfy the at least one performance metric target; and repeating the evaluating and adjusting steps until an optimal solution for the plurality of node parameters is identified based at least in part on the at least one performance metric.

2. The method of claim 1, wherein initializing the simulated environment further comprises:

generating the plurality of environment parameters, wherein the plurality of environment parameters includes at least: an environment size, an environment traffic density, and a signal to interference and noise ratio (SINR), wherein the environment traffic density models a quantity of a plurality of simulated vehicles and a wireless traffic volume of the plurality of simulated vehicles in the simulated environment, and wherein the SINR models noise and interference in the simulated environment.

3. The method of claim 2, wherein adding the plurality of simulated wireless nodes to the simulated environment further comprises:

generating the plurality of node parameters, wherein the plurality of node parameters includes at least: a quantity of simulated wireless nodes, a node location for each of the plurality of simulated wireless nodes, and a node power level for each of the plurality of simulated wireless nodes.

4. The method of claim 2, wherein evaluating the at least one performance metric of the simulated wireless network further comprises:

determining the at least one performance metric of the simulated wireless network; and comparing the at least one performance metric to the at least one performance metric target.

5. The method of claim 4, wherein adjusting the plurality of node parameters further comprises:

training a node parameter adjustment machine learning model based at least in part on the plurality of environment parameters, the plurality of node parameters, and the at least one performance metric, wherein the node parameter adjustment machine learning model is configured to receive the plurality of environment parameters, the plurality of node parameters, and the at least one performance metric as an input and provide an adjusted plurality of node parameters as an output; and adjusting the plurality of node parameters using the node parameter adjustment machine learning model, wherein the node parameter adjustment machine learning model is provided with the plurality of environment parameters, the plurality of node parameters, and the at least one performance metric as the input and provides the adjusted plurality of node parameters as the output.

6. The method of claim 4, wherein adjusting the plurality of environment parameters further comprises:

adjusting the plurality of environment parameters to increase a simulated environment complexity, wherein increasing the simulated environment complexity includes at least: increasing the environment traffic density.

7. The method of claim 6, wherein adjusting the plurality of environment parameters to increase the simulated environment complexity further comprises:

adjusting the plurality of environment parameters using an environment parameter adjustment machine learning algorithm, wherein the environment parameter adjustment machine learning algorithm is configured to receive at least one of: the plurality of environment parameters and the at least one performance metric as an input and provide an adjusted plurality of environment parameters as an output.

8. The method of claim 6, wherein repeating the evaluating and adjusting steps until the optimal solution for the plurality of node parameters is identified further comprises:

identifying at least one simulation stopping condition; and determining the optimal solution to be identified in response to identifying the at least one simulation stopping condition.

9. The method of claim 8, wherein identifying the at least one simulation stopping condition further comprises:

identifying the at least one simulation stopping condition in response to determining that a predetermined quantity of simulations have been executed; and identifying the at least one simulation stopping condition in response to determining that the simulated environment has reached a predetermined simulated environment complexity.

10. A system for providing a computer simulation of wireless infrastructure, the system comprising:

a database;

one or more central computers in electrical communication with the database, wherein the one or more central computers are programmed to:

initialize a simulated environment, wherein the simulated environment includes a plurality of environment parameters;

add a plurality of simulated wireless nodes to the simulated environment to form a simulated wireless network, based on a plurality of node parameters;

evaluate at least one performance metric of the simulated wireless network;

adjust at least one of: the plurality of node parameters and the plurality of environment parameters based at least in part on the at least one performance metric of the simulated wireless network, wherein to adjust at least one of: the plurality of node parameters and the plurality of environment parameters, the one or more central computers are further programmed to:

save the plurality of node parameters in the database in response to determining that the at least one performance metric satisfies at least one performance metric target;

adjust the plurality of environment parameters while holding the plurality of node parameters constant in response to determining that the at least one performance metric satisfies the at least one performance metric target; and adjust the plurality of node parameters while holding the plurality of environment parameters constant in response to determining that the at least one performance metric does not satisfy the at least one performance metric target; and repeat the evaluate and adjust steps until an optimal solution for the plurality of node parameters is identified based at least in part on the at least one performance metric; and save the optimal solution for the plurality of node parameters in the database.

11. The system of claim 10, wherein to initialize the simulated environment, the one or more central computers are further programmed to:

generate the plurality of environment parameters, wherein the plurality of environment parameters includes at least: an environment size, an environment traffic density, and a signal to interference and noise ratio (SINR), wherein the environment traffic density models a quantity of a plurality of simulated vehicles and a wireless traffic volume of the plurality of simulated vehicles in the simulated environment, and wherein the SINR models noise and interference in the simulated environment.

12. The system of claim 11, wherein to add the plurality of simulated wireless nodes to the simulated environment to form the simulated wireless network, the one or more central computers are further programmed to:

generate the plurality of node parameters, wherein the plurality of node parameters includes at least: a quantity of simulated wireless nodes, a node location for each of the plurality of simulated wireless nodes, and a node power level for each of the plurality of simulated wireless nodes.

13. The system of claim 12, wherein to adjust the plurality of node parameters, the one or more central computers are further programmed to:

train a node parameter adjustment machine learning model based at least in part on the plurality of environment parameters, the plurality of node parameters, and the at least one performance metric, wherein the node parameter adjustment machine learning model is configured to receive the plurality of environment parameters, the plurality of node parameters, and the at least one performance metric as an input and provide an adjusted plurality of node parameters as an output; and adjust the plurality of node parameters using the node parameter adjustment machine learning model, wherein the node parameter adjustment machine learning model is provided with the plurality of environment parameters, the plurality of node parameters, and the at least one performance metric as the input and provides the adjusted plurality of node parameters as the output.

14. The system of claim 13, wherein to adjust the plurality of environment parameters, the one or more central computers are further programmed to:

adjust the plurality of environment parameters by sampling from a plurality of probability distributions corresponding to each of the plurality of environment parameters.

15. The system of claim 14, wherein to repeat the evaluate and adjust steps until an optimal solution for the plurality of node parameters is identified, the one or more central computers are further programmed to:

identify at least one simulation stopping condition in response to determining that at least one of: a predetermined quantity of simulations have been executed and the simulated environment has reached a predetermined simulated environment complexity; and determine the optimal solution to be identified in response to identifying the at least one simulation stopping condition.

16. A method for providing a computer simulation of wireless infrastructure for a plurality of simulated vehicles, the method comprising:

initializing a simulated environment, wherein the simulated environment includes a plurality of environment parameters, wherein the plurality of environment parameters includes at least: an environment size, an environment traffic density, and a signal to interference and noise ratio (SINR), wherein the environment traffic density models a quantity of the plurality of simulated vehicles and a wireless traffic volume of the plurality of simulated vehicles in the simulated environment, and wherein the SINR models noise and interference in the simulated environment;

adding a plurality of simulated wireless nodes to the simulated environment to form a simulated wireless network based on a plurality of node parameters, wherein the plurality of node parameters includes at least: a quantity of simulated wireless nodes, a node location for each of the plurality of simulated wireless nodes, and a node power level for each of the plurality of simulated wireless nodes;

evaluating at least one performance metric of the simulated wireless network by comparing the at least one performance metric to at least one performance metric target;

adjusting at least one of: the plurality of node parameters and the plurality of environment parameters based at least in part on the at least one performance metric of the simulated wireless network, wherein adjusting the plurality of node parameters further comprises:

training a node parameter adjustment machine learning model based at least in part on the plurality of environment parameters, the plurality of node parameters, and the at least one performance metric, wherein the node parameter adjustment machine learning model is configured to receive the plurality of environment parameters, the plurality of node parameters, and the at least one performance metric as an input and provide an adjusted plurality of node parameters as an output; and adjusting the plurality of node parameters using the node parameter adjustment machine learning model, wherein the node parameter adjustment machine learning model is provided with the plurality of environment parameters and the at least one performance metric as the input and provides the adjusted plurality of node parameters as the output; and repeating the evaluating and adjusting steps until an optimal solution for the plurality of node parameters is identified based at least in part on the at least one performance metric, wherein the evaluating and adjusting steps are repeated until at least one simulation stopping condition has been identified, and wherein the at least one simulation stopping condition is identified in response to determining that a predetermined quantity of simulations have been executed.

17. The method of claim 16, wherein adjusting the plurality of environment parameters further comprises:

adjusting the plurality of environment parameters to increase a simulated environment complexity using an environment parameter adjustment machine learning algorithm, wherein the environment parameter adjustment machine learning algorithm is configured to receive at least one of: the plurality of environment parameters and the at least one performance metric as an input and provide an adjusted plurality of environment parameters as an output.

* * * * *